United States Patent
Petrov

(10) Patent No.: US 6,650,819 B1
(45) Date of Patent: Nov. 18, 2003

(54) METHODS FOR FORMING SEPARATELY OPTIMIZED WAVEGUIDE STRUCTURES IN OPTICAL MATERIALS

(76) Inventor: Konstantin P. Petrov, 1929 Crisanto Ave., Mountain View, CA (US) 94040

(*) Notice: Subject to any disclaimer, the term of this patent is extended or adjusted under 35 U.S.C. 154(b) by 155 days.

(21) Appl. No.: 09/981,110

(22) Filed: Oct. 16, 2001

Related U.S. Application Data

(60) Provisional application No. 60/242,044, filed on Oct. 20, 2000.

(51) Int. Cl.$^7$ ................................................ G02B 6/10
(52) U.S. Cl. ........................ 385/132; 65/386; 65/117; 385/2
(58) Field of Search ............................... 385/2, 14, 129, 385/132; 65/386, 392, 394, 117; 219/121.61, 121.65

(56) References Cited

U.S. PATENT DOCUMENTS

| | | | |
|---|---|---|---|
| 4,984,861 A | | 1/1991 | Suchoski, Jr. et al. |
| 5,118,923 A | * | 6/1992 | Farina .................... 250/205 |
| 5,982,964 A | | 11/1999 | Marx et al. |
| 6,185,355 B1 | * | 2/2001 | Hung ....................... 385/132 |

* cited by examiner

*Primary Examiner*—Hemang Sanghavi
(74) *Attorney, Agent, or Firm*—Gemfire Corporation

(57) ABSTRACT

A method for forming plural waveguide structures in an optical substrate, such as lithium niobate, employs multiple stages of annealed proton exchange. In each stage, the substrate is masked to define a region corresponding to at least one waveguide structure. The mask-defined region is exposed to a proton exchange agent for a predetermined time and at a predetermined temperature, and the substrate is then annealed at predetermined time/temperature conditions. By selecting appropriate process parameters for each APE stage, each of the resultant waveguide structures may be optimized for desired physical and optical characteristics. The method may be utilized, for example, to fabricate sub-Rayleigh range couplers having high coupling efficiencies.

17 Claims, 4 Drawing Sheets

METHODS FOR FORMING SEPARATELY OPTIMIZED WAVEGUIDE STRUCTURES IN OPTICAL MATERIALS

CROSS-REFERENCE TO RELATED APPLICATION

This application claims the benefit under 35 U.S.C. §119 (e)(1) of U.S. provisional application No. 60/242,044, entitled METHOD OF FABRICATION OF INTEGRATED OPTICAL STRUCTURES HAVING PLURAL WAVEGUIDE STRUCTURES by inventors Petrov et al., filed on Oct. 20, 2000. The aforementioned application is incorporated herein by reference.

GOVERNMENT RIGHTS

This invention was made with Government support under contract no. NAS-00090 awarded by the National Aeronautics and Space Administration. The Government has certain rights in the invention.

BACKGROUND

1. Field of the Invention

The present invention relates generally to methods for fabricating optical waveguides, and more specifically to methods for fabricating plural waveguide sections in a single substrate.

2. Description of the Prior Art

Formation of waveguides in lithium niobate (LN) and similar optical materials is typically accomplished by one of two well-known processes: titanium indiffusion and annealed proton exchange (APE). The APE process is increasingly favored over titanium indiffusion for commercial manufacturing applications due in part to the high temperatures required to achieve waveguide formation by the titanium indiffusion process.

APE traditionally involves a first step of exposing selected regions of an LN substrate to an acidic medium (deemed the proton exchange step), followed by a second step of maintaining the LN substrate at an elevated temperature for a specified time period (deemed the annealing step).

The physical and operational characteristics of waveguides fabricated by the APE process may be optimized for a particular application by tuning the process parameters. For conventional APE, the process parameters consist of the following:

Channel width (w)

Channel duty cycle ($\eta$)

Proton exchange time ($t_e$)

Proton exchange temperature ($T_e$)

Exchange agent

Anneal time ($t_a$)

Anneal temperature ($T_a$)

It is noted that not all of the foregoing process parameters are independent, and that some of the parameters may not be easily varied. For example, the exchange agent (the acidic medium selected to effect proton exchange), which controls overall proton exchange rate at a given temperature, is generally considered to be a fixed parameter, due to the limited availability of acidic media which do not produce etching of the LN substrate.

It is further noted that the proton exchange time and temperature parameters $t_e$ and $T_e$ are mutually dependent, i.e., one can control exchange depth by adjusting either process time or temperature. Similarly, the anneal time and temperature $t_a$ and $T_a$ are mutually dependent. Because of these dependencies, the process temperatures $T_e$ and $T_a$ are generally considered to be fixed, and only the process times are varied.

The limitations and dependencies discussed above effectively reduces the total number of independent APE process parameters to four: w, $\eta$, $t_e$, and $t_a$ (it is recognized that there exists a weak interdependence between w and $\eta$; however, this weak interdependence may be ignored for the purpose of this discussion). The designer of the waveguide-containing device may thus select appropriate values of channel width and duty cycle (which are controlled by adjusting the shape and dimensions of the mask defining the regions exposed to the acidic medium) and exchange and anneal times in order to produce a waveguide having desired physical and operational characteristics.

A problem arises in cases where an integrated optical component designer wishes to fabricate two or more waveguide structures having differing physical or operational characteristics in the LN substrate. In conventional APE waveguide fabrication, all waveguide structures are simultaneously formed in the LN substrate, i.e., a single APE process is employed. Due to the relatively limited number of independent process parameters that may be adjusted, it may be difficult or impossible to select a single set of process parameters that produce the desired physical and operational characteristics in all of the waveguide structures. In other words, a single-stage APE process does not offer a sufficient number of degrees of freedom to optimize fabrication of plural waveguide structures having disparate properties.

For example, a three-section coupler for use in a difference-frequency mixing application may include an input waveguide structure, having a relatively narrow channel width, coupled via an adiabatic taper structure to a multimode mixing waveguide structure having a relatively broad channel width. If the coupler is formed by conventional APE, the anneal time $t_a$ is set by the requirements of the multimode mixing (wide-channel) waveguide structure, and is consequently very long. This long $t_a$ results in excessive proton diffusion in the narrow-channel input waveguide structure, causing the mode size propagating therein to be relatively large. This condition is undesirable, as it prevents matching of the input waveguide mode to a standard optical fiber mode and thereby complicates the task of launching light into the three-section coupler.

U.S. Pat. No. 5,982,964 to Marx et al. describes one approach for creating additional degrees of process freedom to enable separate optimization of the characteristics of different waveguide structures formed in a common substrate. Marx et al. discloses fabricating a first waveguide structure by the titanium indiffusion process, which, as alluded to above, requires high-temperature conditions (approximately 1000° C.) to enable titanium diffusion into the substrate to occur at an industrially practical rate. The titanium-indiffusion process is followed by fabrication of a second waveguide section by APE, which is performed at a relatively low exchange and anneal temperatures $T_e$ and $T_a$ (typically 275° C. and 400° C., respectively). Because the titanium atoms possess very low mobility at the exchange and anneal temperatures, the first waveguide structure remains substantially unchanged during the APE process. In this manner, the parameters of the titanium-indiffusion and APE processes may be independently tuned to optimize desired characteristics in the first and second waveguide structures. It is noted, however, that the Marx et al. approach increases the complexity (and potentially the cost) of manufacture of integrated optical devices by requiring use of two different waveguide fabrication processes operating at different temperature ranges.

SUMMARY

Roughly described, the invention provides a method for forming plural waveguide structures having separately optimized physical and optical characteristics in a common optical substrate. The method comprises a first APE stage, including a first proton exchange step and a first annealing step, wherein protons are diffused into a first region of the optical substrate corresponding to at least a first waveguide structure, and a second APE stage, including a second proton exchange step and a second annealing step, wherein protons are diffused into a second region of the substrate different from the first region and corresponding to at least a second waveguide structure. The first and second regions of the substrate may be defined by openings in first and second masks, which are deposited on the substrate and patterned using conventional techniques. A set of process parameters (e.g., time/temperature conditions, mask channel width, duty cycle, and exchange agent) is selected for each APE stage so as to obtain targeted optical and physical properties in the associated waveguide structure. In effect, the method expands the number of degrees of process freedom relative to a conventional single-stage APE process to thereby enable each waveguide structure to be independently optimized.

The multi-stage APE method of the present invention may be advantageously utilized to fabricate any number of high-performance, compact integrated optics devices, including without limitation sub-Rayleigh range couplers and surface step couplers.

DETAILED DESCRIPTION

Figure 1:
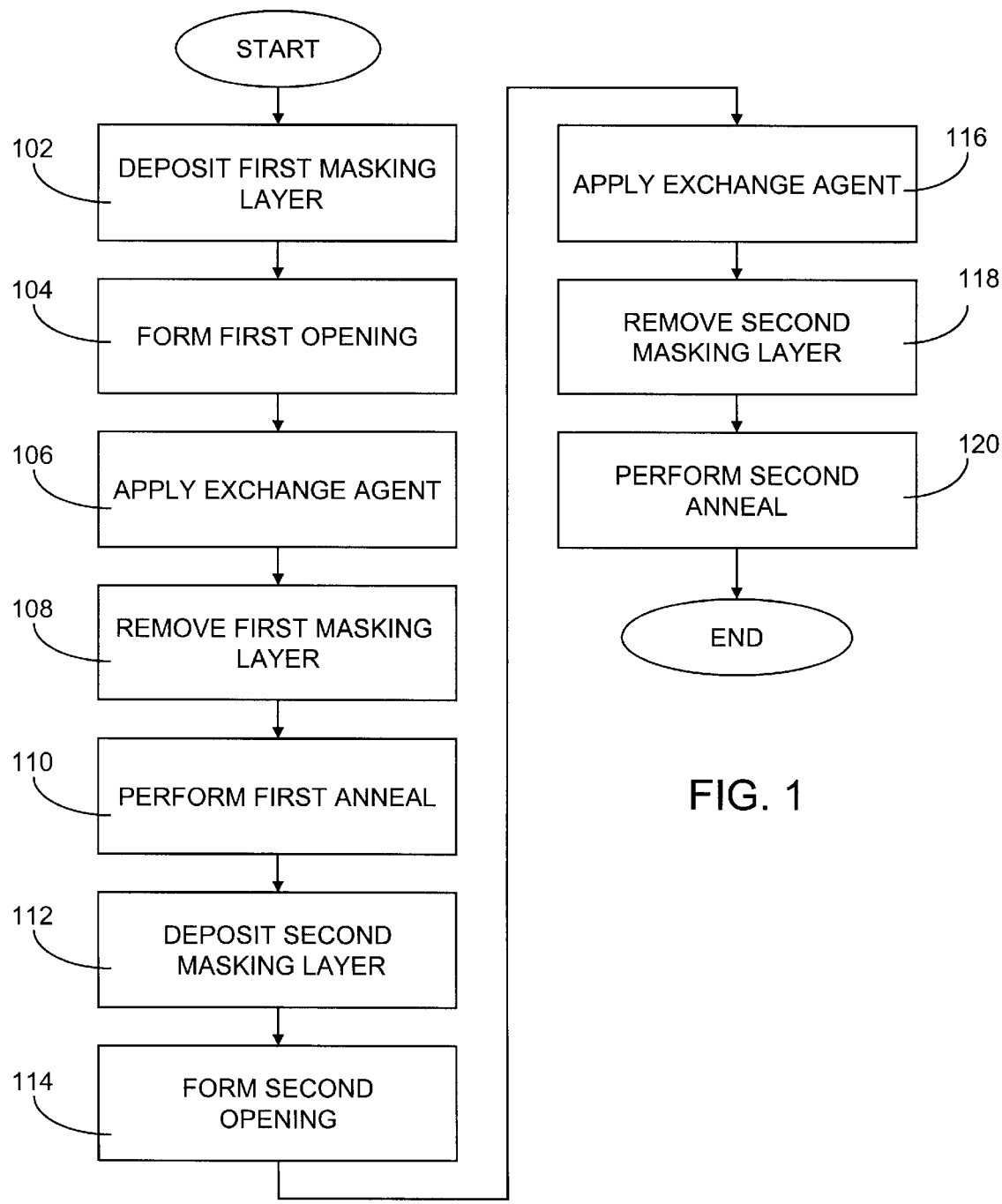
FIG. 1 is a flowchart depicting the steps of a two-stage APE method in accordance with an embodiment of the invention.

The invention will now be described in terms of various embodiments and implementations thereof, which are intended to illustrate rather than limit the invention. FIG. 1 is a flowchart depicting the steps of a two-stage APE method for constructing plural integrated waveguide structures in accordance with one embodiment of the invention. The method of FIG. 1 may best be understood in connection with its application to an exemplary optical device shown in various stages of its fabrication in FIGS. 2(a)–(c) and 3(a)–(c).

Reference is initially directed to FIG. 1a, which shows a substrate in the form of a wafer 200 of lithium niobate (LN) material. As used herein, the term "lithium niobate" is intended to include both pure lithium niobate in its different compositional variations such as congruent and stoichiometric material, as well as lithium niobate doped with magnesium oxide, zinc oxide or other dopants that may be added for various purposes. Wafer 200 may alternatively comprise another suitable optically transparent material in which index-altered waveguide regions may be formed by a proton exchange process. It is noted that wafer 200 may be a representative portion of a larger wafer on which numerous optical devices may be formed.

In a first step 102 of the method, a first masking layer 202 is deposited to a suitable thickness on the upper major surface of wafer 200. First masking layer 202 may also be applied to the edge and lower major surfaces of wafer 200. First masking layer 202 will comprise a material such as silicon dioxide ($SiO_2$) capable of blocking contact between the exchange agent and the underlying portions of wafer 200, and may be applied by any one of a number of techniques known in the art, including without limitation physical or chemical vapor deposition and sputtering.

In a second step 104, an opening 204 of width 206 in a shape and position corresponding to a first optical waveguide structure is formed in first masking layer 202. Opening 204 may be formed by any suitable technique known in the art, such as a photolithographic/etching based method or laser ablation. In the example depicted in FIG. 2(a), which shows the substrate and masking layer following completion of step 104, the width 206 of opening 204 is chosen to be suitable for a wide-channel optical waveguide structure, such as one designed to be single mode at a long wavelength, or multi-mode at a short wavelength. Opening 204 is shown to be closed at one end 208, where the wide-channel optical waveguide structure will terminate, but may extend farther in the opposite direction as desired for different applications. Opening 204 is further shown to be straight and of substantially constant width 206, but may alternatively be curved, tapered and/or segmented, again as desirable for different applications.

In the third step 106, a proton exchange agent is applied to wafer 200 to form a protonated layer 210 in regions of wafer 200 underlying opening 204. The proton exchange step 106 is typically conducted by contacting at least the upper major surface of wafer 200 (having masked layer 202 applied thereto) with a first proton exchange agent bath held at a first exchange temperature $T_{1e}$ for a first exchange time $t_{1e}$. The first exchange agent will typically take the form of a weak or moderate strength organic acid, such as benzoic acid. The first proton exchange step conditions, including first exchange time, temperature $T_{1e}$ (noting the dependency of the two parameters), and exchange agent are selected to produce a desired degree of protonation of layer 210. In a typical implementation of the present method, $T_{1e}$ is around 160° C., and $t_{1e}$ is approximately 25 hours. Following completion of the first proton exchange step 106, wafer 200 is removed from the exchange agent bath, and first masking layer 202 is stripped from the wafer 200, step 108. Stripping of first masking layer 202 may be achieved using a suitable etch solution or similar expedient known in the art.

Figure 2A:
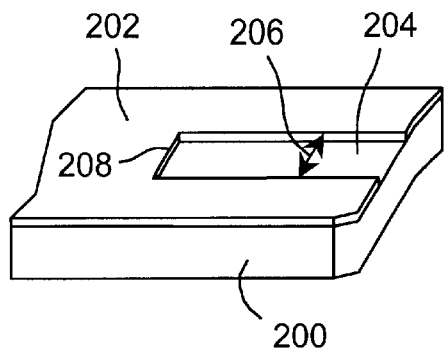
FIGS. 2(a)–(c) are symbolic perspective views depicting the formation of a first waveguide structure in an optical substrate at various points of the multi-stage APE method.
Figure 2B:
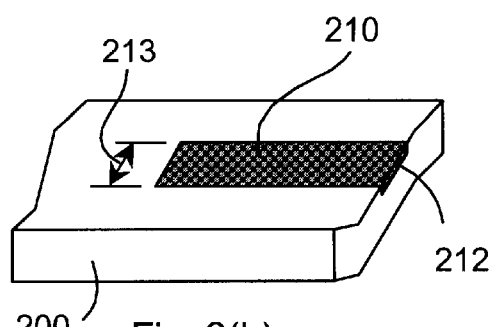

FIG. 2(b) depicts wafer 200 after completion of the first proton exchange and mask removal steps 106 and 108. Protonated layer 210 has a width 213 substantially equal to width 206 of mask opening 204, and a relatively small depth 212 extending downwardly into wafer 200.

Figure 2C:
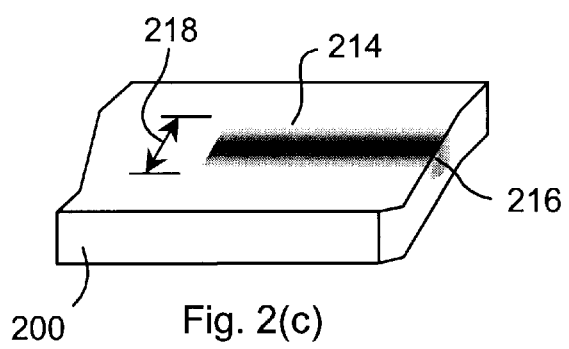

In the fourth step 110, wafer 200 is annealed to form a deeper (relative to protonated layer 210) protonated channel 214. Annealing of wafer 200 is typically performed by uniformly heating wafer 200 to a first anneal temperature and maintaining it at $T_{1a}$ for a first anneal time $t_{1a}$. As will be discussed in further detail below, the first anneal conditions, including first anneal time $t_{1a}$ and temperature $T_{1a}$, are chosen in view of the desired optical and physical properties of the associated resultant first waveguide structure, including waveguide depth and width, refractive index profile, and mode confinement. Typical anneal conditions for first anneal step 110 set $T_{1a}$ to about 340° C. and $t_{1a}$, to approximately 75 hours. FIG. 2(c), which depicts wafer 200 following completion of the first anneal step 110, shows protonated channel 214 as having a significantly greater depth 216 and somewhat larger width 218 relative to depth 212 and width 213 of protonated layer 210. As is known in the art, the depth 216 and width 218 of protonated channel 214 are controlled primarily by adjusting the first anneal time $t_{1a}$ and/or temperature $T_{1a}$, wherein higher anneal temperatures and/or longer anneal times will produce a greater depth 216 and width 218.

Next, a second masking layer 302 is deposited on at least the upper major surface of wafer 200, step 112. Second masking layer 302 will again typically comprise a material, such as $SiO_2$, capable of blocking contact between the exchange agent and the underlying portions of wafer 200, and may be applied by any one of a number of techniques known in the art, including without limitation physical or chemical vapor deposition and sputtering.

Figure 3A:
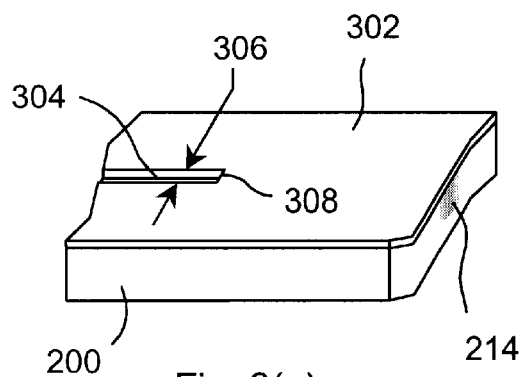
FIGS. 3(a)–(c) are symbolic perspective views depicting the formation of a second waveguide structure in the optical substrate at various points of the multi-stage APE method.

In step 114, an opening 304 in a shape and position corresponding to a second optical waveguide structure is formed in second masking layer 302, as depicted by FIG. 3(a). Formation of opening 304 may be accomplished in substantially the same manner as described above in connection with FIG. 2(a). It is noted that in the implementation depicted herein, opening 304 has a width 306 significantly narrower than width 206 of opening 204 in first masking layer 202. As will be discussed below in further detail, the first or initial stage(s) of the multi-stage APE process will generally be employed to form waveguide structures having relatively large transverse dimensions, whereas the second or subsequent stages are employed to form waveguide structures having relatively small transverse dimensions. Opening 304 may be precisely positioned with respect to the previously formed protonated channel 214 using fiducial marks or similar alignment techniques.

Opening 304 is shown to be closed at one end 308 at the termination of the corresponding narrow-channel (second) waveguide structure, but may extend farther in the opposite direction as desired for particular applications. Opening 304 is shown to be straight and of substantially constant width 306 but may alternatively be curved, tapered and/or segmented, as desirable for different applications.

In the next step 116, a proton exchange agent (which is typically, but not necessarily, the same exchange agent used for the first proton exchange step 106) is applied to wafer 200 to form a protonated layer 310 in regions of wafer 200 immediately underlying opening 304. The second proton exchange step 116 may be performed by contacting at least the upper major surface of wafer 200 (with masked layer 302 fixed thereto) with a second exchange agent held at a second exchange temperature $T_{2e}$ for a second exchange time $t_{2e}$. The second exchange agent will again typically take the form of a weak or moderate strength organic acid, such as benzoic acid. The second proton exchange step conditions, including second exchange time $t_{2e}$, temperature $T_{2e}$, and exchange agent are selected to produce a desired degree of protonation of layer 310. In a typical implementation of the present method, $T_{2e}$ is around 160° C., and tie is approximately one hour. Following completion of the second proton exchange step 116, wafer 200 is removed from the exchange agent bath, and second masking layer 302 is stripped from the wafer 200, step 118. Stripping of second masking layer 302 may be achieved using a suitable etch solution or similar expedient known in the art.

Figure 3B:
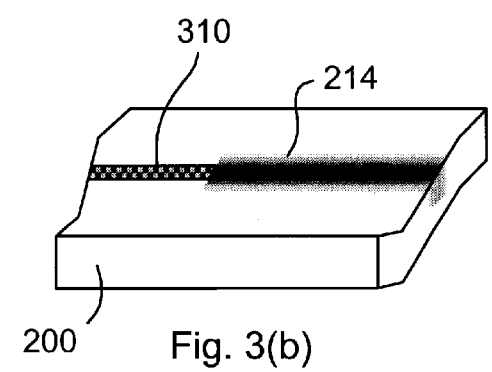

FIG. 3(b) depicts wafer 200 after completion of the proton exchange and mask removal steps 116 and 118. It is noted that protonated layer 310, which abuts at one end thereof protonated channel 214, has a width substantially equal to width 306 of mask opening 304, and a relatively small depth extending downwardly into wafer 200.

In the final step 120, wafer 200 is subjected to a second annealing step to form a deeper protonated channel 312. The second annealing step 120 involves uniformly heating wafer 200 to a second anneal temperature $T_{2a}$ (which will typically, but not necessarily, be substantially equal to first anneal temperature $T_{1a}$) and maintaining it at $T_{2a}$ for a second anneal time $t_{2a}$. The parameters of second anneal time $t_{2a}$ and/or temperature are selected to effect a targeted amount of diffusion of protons initially contained within protonated layer 214 and thereby cause the second waveguide structure to possess the desired set of physical and operational characteristics. Because of the relatively smaller dimensions of the second waveguide structure (defined by the dimensions of protonated channel 312), the second anneal time required for sufficient proton diffusion will generally be significantly shorter than the first anneal time $t_{1a}$ (assuming that the anneal temperatures $T_{1a}$ and $T_{2a}$ are constant). Typical second anneal conditions have $T_{2a}$ equal to approximately 340° C. and $t_{2a}$ equal to around 10 hours.

Figure 3C:
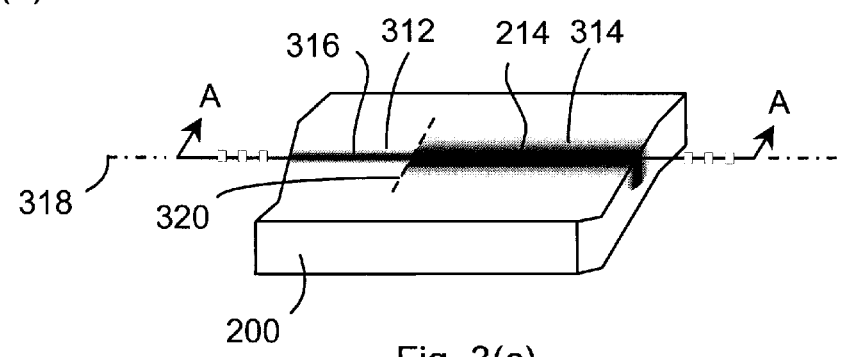

FIG. 3(c) depicts wafer 200 following completion of second anneal step 120. Because the entire wafer is brought to an elevated temperature during the second anneal step, proton diffusion will also occur within protonated channel 214 (which, together with the surrounding portions of substrate 200, defines first waveguide structure 314) resulting in some deepening and widening of the channel. The device designer will therefore adjust the anneal conditions for the first anneal step 110 to account for additional diffusion effected during the subsequent anneal steps (which, in the present example, consists of second anneal step 120). For example, the designer may set the first anneal time $t_{1a}$ such that the total anneal time ($t_{1a}+t_{2a}$) yields the desired physical/operational qualities of first waveguide structure. It will be recognized that second waveguide structure 316 (defined by protonated channel 312 and surrounding portions of the substrate 200) is subjected only to a single anneal step 120 and so its operational and physical characteristics do not depend on the conditions under which first anneal step 110 is performed.

In essence, the above-described waveguide fabrication method, which provides two proton exchange/annealing stages, expands the number of degrees of process freedom and enables the designer to select a separate set of process parameters (including mask width, proton exchange time/temperature conditions, annealing time/temperature conditions, and duty cycle) for each stage. The availability of these additional degrees of process freedom thereby enables independent optimization of the characteristics of the two resultant waveguide structures 314 and 316.

It will be apparent to one skilled in the art that the method described above can be extended to any number of exchange/anneal stages, and to other geometrical shapes of refractive index-modified regions besides optical waveguides, wherein a plurality of progressively smaller-featured integrated optical structures are fabricated in succession.

The method of the invention enables, inter alia, fabrication of improved integrated optical devices employing narrow-channel and wide-channel optical waveguides on the same substrate. Referring again to FIG. 3(c), optical waveguide structures 314 and 316 are shown to be aligned along a common optical axis 318 with their facing ends immediately adjacent to each other at a plane 320 that is perpendicular to both the wafer surface and optical axis 318. This arrangement represents a short, sub-Rayleigh range narrow-channel to wide-channel waveguide junction, which has desirable qualities of mode matching and consequent high coupling efficiency at the coupling plane indicated at 320. It should be apparent to those familiar with the art that a suitable number of tunable process parameters are provided in this method to optimize such a structure, both in terms of optical mode overlap at 320 and low-loss waveguides on either side of plane 320, whereas the conventional one-step annealed ion-exchange waveguide fabrication method (and other known methods using different processes) do not provide the degrees of freedom or capabilities required for optimization to the same degree.

Figure 4:
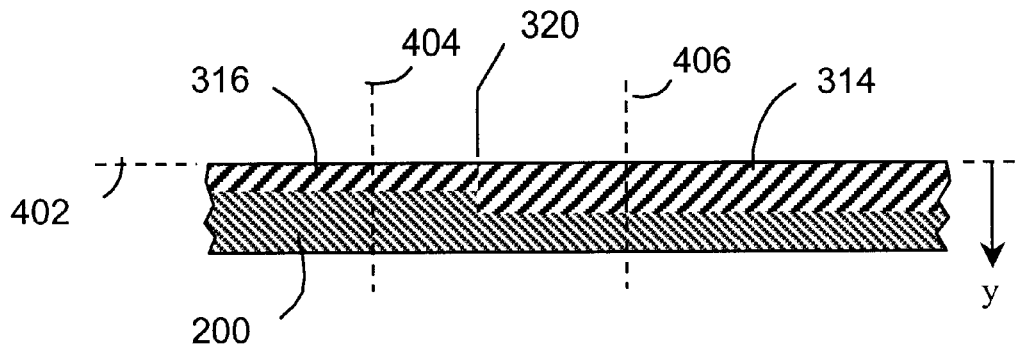
FIG. 4 is a longitudinal cross-sectional view taken through line A—A of FIG. 3(c), showing in particular the spatial relationship of the first and second waveguide structures.
Figure 5:
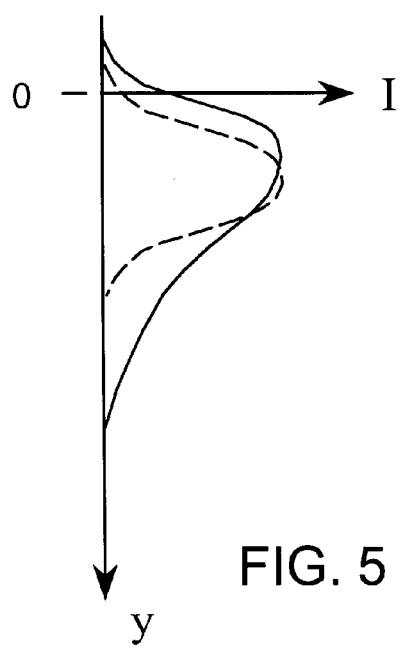
FIG. 5 depicts plots showing typical profiles of mode intensity versus depth within the first and second waveguide structures of FIG. 4.

The optical mode overlap of the sub-Rayleigh range waveguide junction may be further explained with reference to FIG. 4 and 5. FIG. 4 is a cross-sectional view taken along the line A—A identified in FIG. 3($_c$). The narrow-channel (second) waveguide structure 316 and wide-channel (first) waveguide structure 314 are shown in heavy shading, and their junction is shown disposed at plane 320. FIG. 5 depicts exemplary profiles of local light intensity I in the two waveguide structures 314 and 316 (measured at longitudinal positions 404 and 406) plotted as a function of depth y (measured from the wafer surface in the Y-direction), for light at a wavelength that is propagating as a weakly confined single mode in second waveguide structure 316 and as the (more confined) fundamental mode of multiple propagation modes in first waveguide structure 314. The intensity profiles within waveguide structures 314 and 316 are respectively shown as solid and dotted lines. It may be discerned that the mode profiles within the two waveguide structures 314 and 316 exhibit substantial overlap, suggesting high coupling efficiency at the junction of the waveguide structures. It should be understood that the specific optical waveguide properties shown here such as the particular mode properties, profiles and degree of confinement of light are presented for illustrative purposes and that other mode properties and shapes can be employed in different applications while conforming to the principles described.

Figure 6:
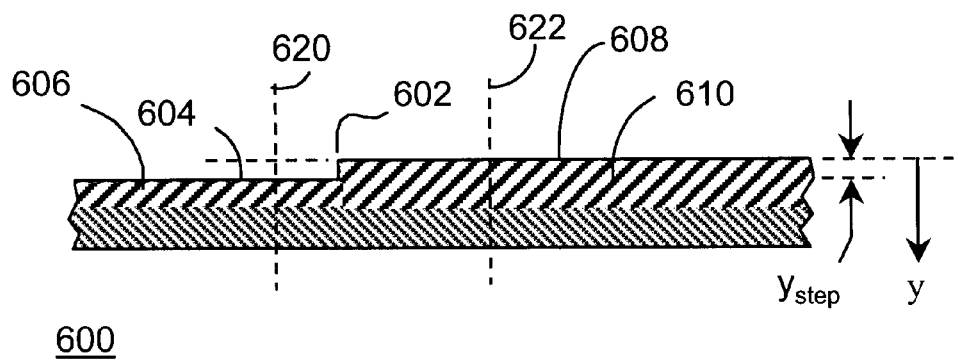
FIG. 6 is a longitudinal cross-sectional view of a step-coupler device comprising first and second waveguide structures formed in an optical substrate by the FIG. 1 method.

Another integrated optical device enabled by the method of this invention is a surface step device (referred to hereinbelow as a "step coupler"), which provides efficient selective coupling of light from a single mode optical waveguide structure to a higher mode of a multi-mode optical waveguide structure. FIG. 6 is a fragmentary cross-sectional view of a portion of an exemplary step coupler 600. Step coupler 600 is closely similar in its construction to the sub-Rayleigh range junction device depicted in FIGS. 2–4 and described above, with the principal difference being the inclusion of a surface step 602. Surface step 602 causes wafer surface 604 overlying narrow-channel waveguide structure 606 to be lower, in the Y-direction, than surface 608 overlying wide-channel waveguide structure 610. Step 602 may be in the form of a trench containing, and slightly wider than, the narrow-channel waveguide structure, or extending over a wider region of the wafer surface as appropriate for different applications. The trench may be fabricated by a known method such as etching, ion milling, or laser ablation. The height difference $Y_{step}$ of the surface step can be appropriately chosen as explained below.

Figure 7:
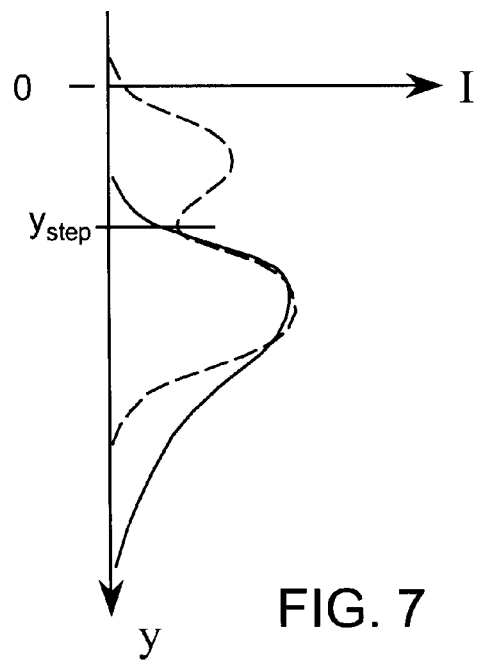
FIG. 7 depicts plots showing typical profiles of mode intensity versus depth within the first and second waveguide structures of FIG. 6.

FIG. 7 depicts exemplary profiles of local light intensity I in the two waveguide structures 606 and 610 (measured at longitudinal positions 620 and 622) plotted as a function of depth y (measured from the wafer surface in the Y-direction), for light at a wavelength that is propagating as a weakly confined single mode in narrow-channel waveguide structure 606 and as a "One-Zero" (1,0) higher-order mode in wide-channel waveguide structure 610. The intensity profiles within waveguide structures 610 and 606 are respectively shown as dotted and solid lines. The mode profile of the "One-Zero" mode in the wide-channel waveguide (dotted line) has two peaks corresponding to two lobes as known in the art. The step height $y_{step}$ is selected to provide good mode overlap and efficient coupling from the narrow-channel (single-mode waveguide) into a selected higher-order mode of the wide-channel (multimode) waveguide structure, which in this case is the "One-Zero" mode.

Alternatively by appropriate choice of waveguide width, depth, refractive index profile, and step height, a step coupler may provide efficient coupling into other higher-order modes.

Figure 8:
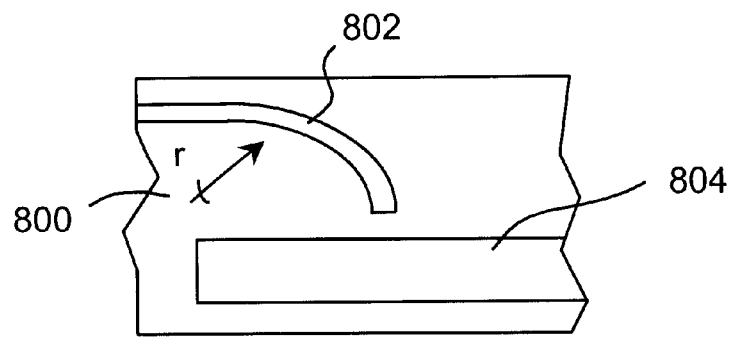
FIG. 8 is a symbolic fragmentary top plan view of a coupler device formed by the FIG. 1 method.
Figure 9:
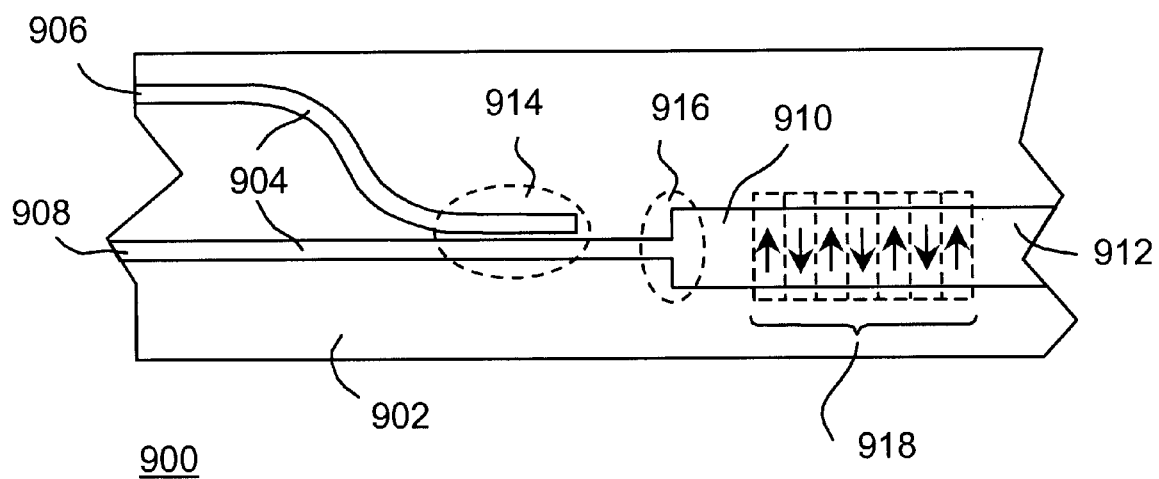
FIG. 9 is a symbolic fragmentary plan view of a compact optical difference frequency generator device, a portion of which is formed by the FIG. 1 method.

Other improved integrated optical devices enabled by the method of this invention are depicted in FIGS. 8 and 9. FIG. 8 shows a portion of an optical substrate 800 adapted with a narrow-channel optical waveguide structure 802 and a wide-channel optical waveguide 804. Waveguides structures 802 and 804 are preferably fabricated by the two-stage APE method described above in connection with FIG. 1. Waveguide 802 has a bend of radius r. It is known in the art that such bends cannot have curvature of small radius (measured in units of channel width) without incurring significant radiative loss of light propagating in the waveguide, and thus the minimum area required on the wafer surface for a low-loss bend scales approximately with the square of the waveguide channel width. Waveguide 802 has a small channel width, and consequently can have a small bend radius r. It can therefore take up a small region of the substrate 800 area, which is desirable to provide higher integration density on a chip. With the fabrication method of this invention, optimum parameters, such as confinement of light, can be realized in both waveguide structures 802 and 804. In alternative embodiments, a different type of large, high-refractive index optical structure may be substituted for wide-channel optical waveguide structure 804 as suitable other applications.

Referring to FIG. 9, there is shown a compact integrated optical difference frequency generator device 900 formed on an optical substrate 902. Device 900 comprises narrow-channel waveguide structures 904 having short-wavelength input ports 906 and 908, a wide-channel waveguide structure 910 with output port 912, a waveguide directional coupler 914 utilizing small-radius waveguide bends formed according to an embodiment of this invention, a sub-Rayleigh range waveguide junction 916 again formed in accordance with an embodiment of the invention, and a periodically poled nonlinear optical region 918. In a particular implementation of device 900 designed for input light wavelengths of 1,083 nm and 834 nm, with a nonlinear region 918 that is approximately 1.5 cm long, has been observed to generate light at an output wavelength of, 3,630 nm with an efficiency of 0.58%/W per cm$^2$ (of nonlinear region length). The smaller size of the waveguide bends, directional coupler, and narrow-to-wide channel waveguide junction, compared to known art, is desirable for higher optical integration density and consequent reduced cost of such devices.

It should be appreciated that the two-stage waveguide fabrication method may be utilized in connection with ionic transfer processes other than proton exchange, and with optical substrate materials other than lithium niobate. For example, the two-stage fabrication method may also be applied to waveguide fabrication in glasses (such as zinc-borosilicate 0211 glass available from Corning Incorporated of Corning, N.Y.) using silver-sodium ion exchange. Other suitable alternative ionic transfer processes that may be employed in connection with the invention include reverse proton exchange and field-assisted ion exchange.

It should be further appreciated by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be beneficially utilized in any number of environments and implementations.

What is claimed is:

1. A method for forming plural waveguide structures in a lithium niobate substrate having a major surface, comprising the steps of:
   (a) exposing a first region of said major surface to a first proton exchange agent at first proton exchange conditions;
   (b) annealing said substrate at first anneal conditions;
   (c) exposing a second region of said major surface different from said first region to a second proton exchange agent at second proton exchange conditions; and
   (d) annealing said substrate at second anneal conditions; wherein said first proton exchange conditions and said first anneal conditions are selected to produce a first set of optical and physical characteristics in at least a first waveguide structure underlying said first region, and said second proton exchange conditions and said second anneal conditions are selected to produce a second set of optical and physical characteristics in at least a second waveguide structure underlying said second region.

2. The method of claim 1, wherein said step (a) further comprises the steps of:
   applying a mask layer to said major surface;
   forming an opening in said mask layer to define said first region; and
   removing said mask layer after said first region has been exposed to said first exchange agent at said first exchange conditions.

3. The method of claim 2, wherein said step (c) further comprises the steps of:
   applying a mask layer to said major surface;
   forming an opening in said mask layer to define said second region; and
   removing said mask layer after said second region has been exposed to said second exchange agent at said second conditions.

4. The method of claim 1, wherein said first region has a transverse dimension significantly greater than a corresponding transverse dimension of said second region.

5. The method of claim 1, wherein said first waveguide structure is sized for multi-mode propagation at a selected wavelength and said second waveguide structure is sized for single mode propagation at said selected wavelength.

6. The method of claim 5, wherein an output end of said second waveguide structure is disposed immediately adjacent to an input end of said first waveguide structure such that light propagating through said second waveguide structure is coupled into said first waveguide structure.

7. The method of claim 6, wherein the optical axes of said first and second waveguide structures are aligned.

8. The method of claim 1, wherein said second optical waveguide structure includes a short-radius arcuate portion.

9. The method of claim 1, wherein said first and second exchange agents comprise organic acids.

10. The method of claim 9, wherein said first and second exchange agents both comprise benzoic acid.

11. An article having at least first and second waveguide structures formed in an optical substrate, said article being constructed by:
    (a) exposing a first region of a major surface of said substrate to a first proton exchange agent at first proton exchange conditions;
    (b) annealing said substrate at first anneal conditions;
    (c) exposing a second region of said major surface different from said first region to a second proton exchange agent at second proton exchange conditions; and
    (d) annealing said substrate at second anneal conditions; wherein said first proton exchange conditions and said first anneal conditions are selected to produce a first set of optical and physical characteristics in at least a first waveguide structure underlying said first region, and said second proton exchange conditions and said second anneal conditions are selected to produce a second set of optical and physical characteristics in at least a second waveguide structure underlying said second region.

12. The article of claim 11, wherein said first region has a transverse dimension significantly greater than a corresponding transverse dimension of said second region.

13. The article of claim 11, wherein said first waveguide structure is sized for multi-mode propagation at a selected wavelength and said second waveguide structure is sized for single mode propagation at said selected wavelength.

14. The article of claim 13, wherein an output end of said second waveguide structure is disposed immediately adjacent to an input end of said first waveguide structure such that light propagating through said second waveguide structure is coupled into said first waveguide structure.

15. The article of claim 14, wherein the optical axes of said first and second waveguide structures are aligned.

16. The article of claim 11, wherein said second optical waveguide structure includes a short-radius arcuate portion.

17. The article of claim 11, wherein said substrate comprises lithium niobate.

* * * * *